US009840146B2

(12) United States Patent
Lagant et al.

(10) Patent No.: US 9,840,146 B2
(45) Date of Patent: Dec. 12, 2017

(54) MOTOR-DRIVEN SCOOTER

(71) Applicant: DECATHLON, Villeneuve d'Ascq (FR)

(72) Inventors: Florent Lagant, Roubaix (FR); Mathieu Guery, Lille (FR)

(73) Assignee: DECATHLON, Villeneuve d'Ascq (FR)

( * ) Notice: Subject to any disclaimer, the term of this patent is extended or adjusted under 35 U.S.C. 154(b) by 0 days.

(21) Appl. No.: 15/105,617

(22) PCT Filed: Dec. 8, 2014

(86) PCT No.: PCT/EP2014/076931
§ 371 (c)(1),
(2) Date: Jun. 17, 2016

(87) PCT Pub. No.: WO2015/091074
PCT Pub. Date: Jun. 25, 2015

(65) Prior Publication Data
US 2016/0311322 A1    Oct. 27, 2016

(30) Foreign Application Priority Data

Dec. 18, 2013 (FR) .................................... 13 62934

(51) Int. Cl.
*B60K 31/02* (2006.01)
*B62M 6/45* (2010.01)
(Continued)

(52) U.S. Cl.
CPC ............... *B60K 31/02* (2013.01); *B62H 5/18* (2013.01); *B62K 3/002* (2013.01); *B62K 11/02* (2013.01);
(Continued)

(58) Field of Classification Search
CPC . B60K 3/02; B60K 3/002; B62H 5/18; B62K 11/02; B62K 31/02
See application file for complete search history.

(56) References Cited

U.S. PATENT DOCUMENTS 5,602,448 A    2/1997  Yaguchi
2002/0117341 A1*  8/2002  Lan ....................... B62K 3/002
                                            180/181

(Continued)

FOREIGN PATENT DOCUMENTS

DE    10053043 A1    9/2001
EP     0559231 A1    9/1993
(Continued)

*Primary Examiner* — John Walters
*Assistant Examiner* — James Triggs
(74) *Attorney, Agent, or Firm* — MH2 TECHNOLOGY LAW GROUP, LLP

(57) ABSTRACT

The invention relates to a scooter (10) including:
 a frame (12);
 a front wheel (20) and a rear wheel (22) attached to the frame;
 a motor (24) configured for driving into rotation at least one of the front and rear wheels; and
 a unit (26) for controlling the motor.
The invention is characterized by the fact that the unit for controlling the motor includes:
 acceleration detection means for detecting an acceleration phase of the scooter;
 deceleration detection means for detecting a deceleration phase of the scooter;
 the control unit being configured for actuating the motor when a deceleration phase having a period at least equal to a first predetermined threshold has been detected by the deceleration detection means after detection of an acceleration phase by the acceleration detection means.

10 Claims, 3 Drawing Sheets

Figure 1A:
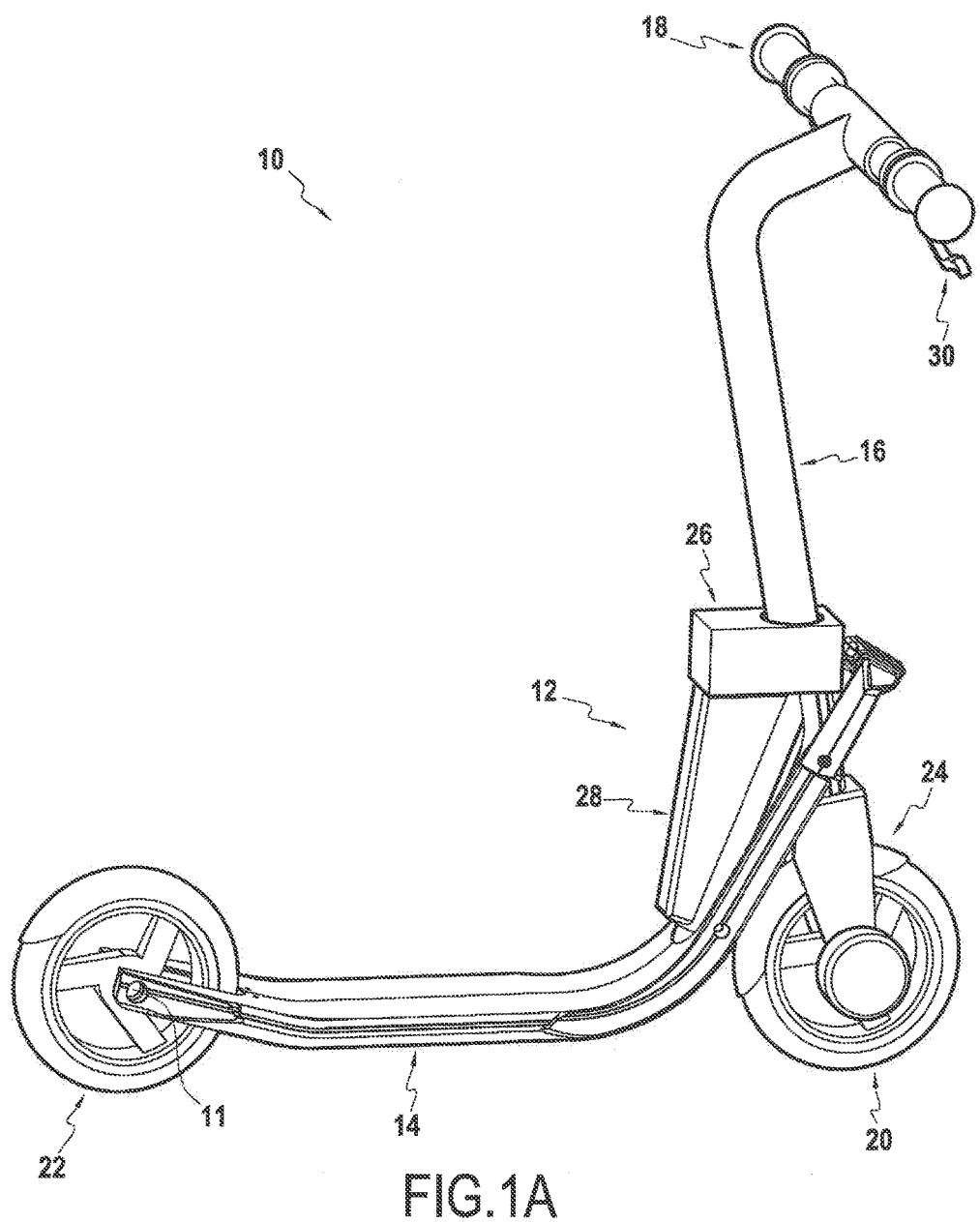

(51) Int. Cl.
   *B62H 5/18*   (2006.01)
   *B62K 3/00*   (2006.01)
   *B62K 11/02*  (2006.01)
   *B62M 6/65*   (2010.01)
   *B60K 31/00*  (2006.01)

(52) U.S. Cl.
   CPC ............... B62M 6/45 (2013.01); B62M 6/65 (2013.01); *B60K 2031/0091* (2013.01); *Y02T 10/7258* (2013.01)

(56) References Cited

U.S. PATENT DOCUMENTS

| | | |
|---|---|---|
| 2002/0170763 A1 | 11/2002 | Townsend |
| 2004/0206563 A1 | 10/2004 | Murata |
| 2012/0310442 A1 | 12/2012 | Doutaz et al. |
| 2013/0054068 A1 | 2/2013 | Shoge |
| 2014/0196968 A1 | 7/2014 | Bieler et al. |

FOREIGN PATENT DOCUMENTS

| | | |
|---|---|---|
| EP | 0569954 A1 | 11/1993 |
| EP | 1799538 A1 | 6/2007 |
| EP | 2269907 A2 | 1/2011 |
| EP | 2289794 A1 | 3/2011 |
| EP | 2537739 A1 | 12/2012 |
| FR | 2953284 A1 | 6/2011 |
| FR | 2961166 A1 | 12/2011 |
| JP | H11-59558 A | 3/1999 |
| WO | 2006/029514 A1 | 3/2006 |
| WO | 2010/150236 A2 | 12/2010 |
| WO | 2010/150237 A1 | 12/2010 |
| WO | 2010150238 A1 | 12/2010 |
| WO | 2012061819 A1 | 5/2012 |

\* cited by examiner

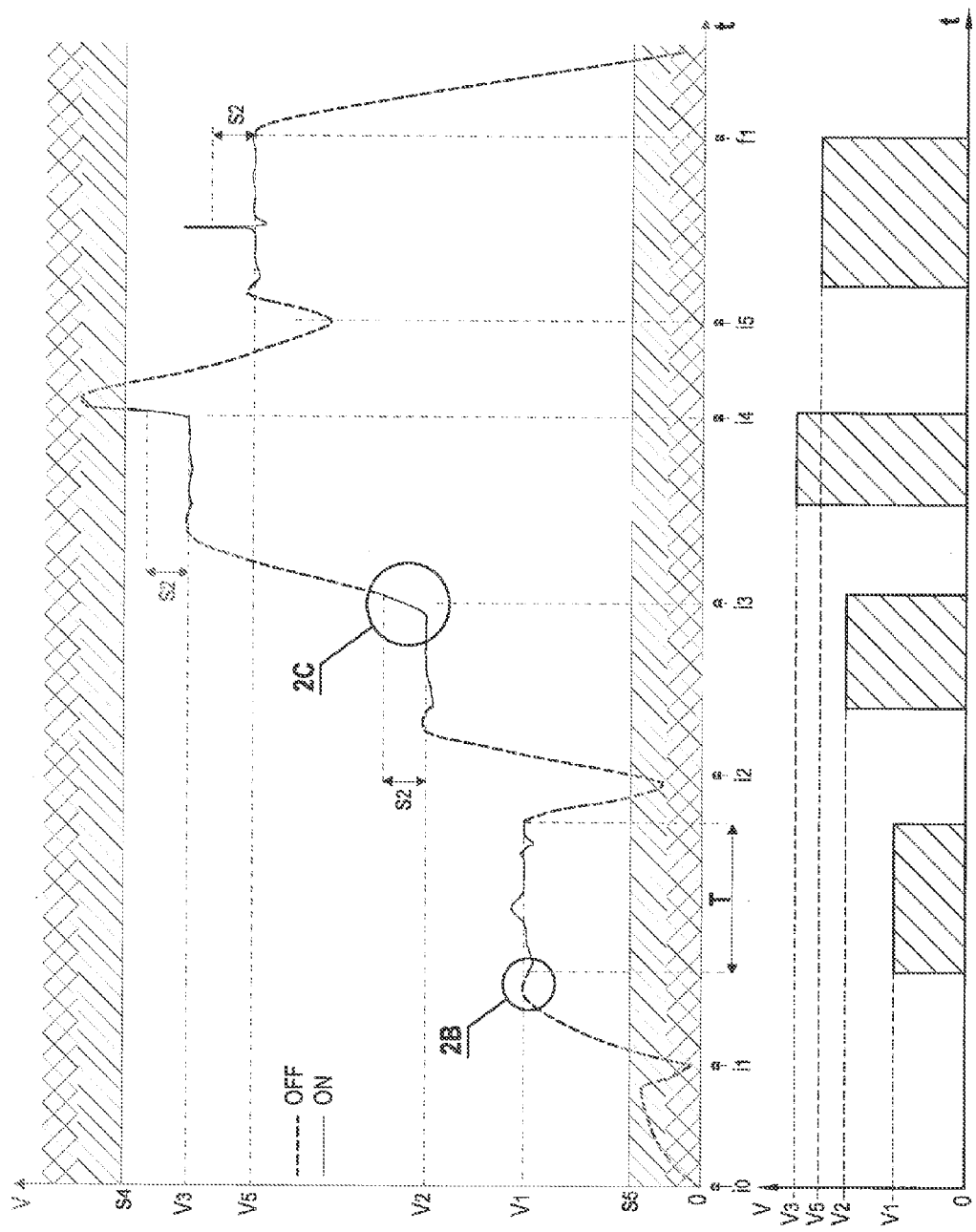

MOTOR-DRIVEN SCOOTER

BACKGROUND OF THE INVENTION

The object of the present invention is a motor-driven scooter. In particular it finds application for practicing outdoor leisure activities or for trips over medium or long distances, in particular in an urban environment, for example within the scope of intermodality.

By intermodality, is meant the combination of different modes of transport, such as walking, cycling, scootering, metro, bus, . . . used on a single path.

Motor-driven scooters are known for which the power of the motor is controlled by a control unit actuated by the user.

Such a scooter is in particular proposed by document US 2002/170763, which describes a scooter including a frame, a front wheel and a rear wheel attached to the frame, a motor configured for driving the rear wheel into rotation, and a unit for controlling the motor.

By actuating the control unit, the user selects one of the predetermined powers of the motor, and subsequently the speed of the scooter.

Motor-driven scooters are also known for which the control unit includes a trigger for example positioned on the handlebar of the scooter.

By actuating the trigger, for example by pivoting it around the axis of the handlebar, the user modifies the power of the motor, in a similar way to the actuation of the control unit of a moped.

Nevertheless, such products do not satisfy the users who wish to benefit from assistance allowing reduction of muscular force for example in order to cover longer distances than with a usual scooter, while having the possibility of scootering in a traditional way, i.e. for example, by maintaining one foot on the frame of the scooter, while the other foot applies pulses on the ground. Further, such products do not allow automatic adaptation of the power of the motor to the forces exerted by the user.

OBJECT AND SUMMARY OF THE INVENTION

The object of the present invention is to solve, inter alia, the insufficiencies described above of existing motor-driven scooters, by proposing a motor-driven scooter for which the power of the motor is controlled by the forces exerted by the user.

This object is achieved by the fact that the invention deals with a scooter for which the control unit includes:
- acceleration detection means for detecting an acceleration phase of the scooter;
- deceleration detection means for detecting a deceleration phase of the scooter;
- the control unit being configured for actuating the motor when a deceleration phase having a duration at least equal to a first pre-determined threshold has been detected by the deceleration detection means after detection of an acceleration phase by the acceleration detection means.

Thus, this device is configured so that the motor is actuated according to the forces exerted by the user.

By acceleration and deceleration of the scooter, is meant a phase during which the speed of the scooter increases and decreases respectively.

More particularly, the control unit is configured for actuating the motor after a muscular force has been exerted by the user.

By muscular force, is understood for example and in a non-limiting way, a pulse given by the user to the scooter allowing the scooter to be set or maintained in motion, the user applying, with one of his/her legs a pressure on the ground, while the other leg is maintained on the frame of the scooter, and more particularly on the platform positioned between the front and rear wheels.

The fact of conditioning the actuation of the motor to detection of a deceleration phase following the detection of an acceleration phase gives the possibility of not actuating the motor if the user exerts a pulse on the scooter, which would risk inter alia perturbing the traditional and manual use of the scooter by the user.

The control unit may therefore be disabled so that the motor-driven scooter according to the present invention does not suppress the possibility for the user of setting or maintaining the scooter in motion by means of traditional muscular forces.

Moreover, the fact of conditioning the actuation of the motor to a detection of a sufficiently long deceleration phase gives the possibility of not actuating the motor when the user exerts a new pulse, substantially immediately after the acceleration detected by the acceleration detection means.

In other words, the control unit is configured so that, when the user exerts different consecutive pulses close to each other, for example in order to initiate the movement of the scooter after its immobilization, the motor is not actuated, so as not to perturb the forces exerted by the user.

By successive pulses close to each other in time, are meant pulses which are exerted by the user to have a duration elapsing between the end of the acceleration phase detected by the acceleration protection means at the end of the first pulse, and the beginning of the acceleration phase, also detected by the acceleration protection means, at the end of the next pulse, which is not greater than the first predetermined threshold. As stated otherwise, two successive pulses should occur within a delay less than the first predetermined threshold.

By end of the acceleration phase, is meant the moment which precedes the moment when the speed of the scooter begins to decrease, for example because of friction of the scooter on the road on which it runs.

When the user no longer exerts any new pulse on the scooter, the scooter describes a deceleration phase detected by the deceleration detection means; when the deceleration detection means detect a deceleration phase for which the duration is greater than the first predetermined threshold, the motor is actuated, so as to suppress deceleration of the scooter.

In other words, the control unit of the motor is configured in order to actuate the motor so as to supplement the muscular forces exerted by the user.

The invention is described hereafter in a series of alternative embodiments, which may be considered alone or in combination with one or more of the preceding ones.

Advantageously, the control unit is configured for actuating the motor after detection of said deceleration phase so that the speed of the scooter is maintained at a set speed value.

With this arrangement, the control unit is configured so that the motor is actuated in order to suppress the natural deceleration of the scooter for example inherent to the frictional forces.

Advantageously, the set speed value depends on the triggering speed. By triggering speed is meant the speed of the scooter when the motor is actuated.

The triggering speed may therefore correspond to the speed of the scooter at the end of the duration of the deceleration phase detected by the deceleration means; alternatively, it may correspond to a speed of less than the speed of the scooter at the end of the duration of the deceleration phase detected by the deceleration detection means, with the assumption that the motor is not simultaneously actuated at the end of the duration of the detected deceleration phase, but slightly later on, the speed of the scooter, with this assumption, continuing to decrease.

Thus, the control unit is configured so that the assistance of the scooter depends on the forces exerted by the user which allow the triggering speed to be reached. Therefore, it is understood that the control unit is configured so that the assistance generated by the actuation of the motor is exerted so as not to surprise the user, by a power of the motor which would be independent of the speed of the scooter, detected at the end of the deceleration phase detected by the deceleration detection means for which the duration exceeds the first predetermined threshold.

Preferably, the set speed value is equal to the speed of the scooter upon actuation of the motor.

With this arrangement, the assistance generated by the actuation of the motor is particularly fluid and does not cause any sudden and abrupt acceleration or deceleration, able to surprise the user, or even destabilize him/her.

Advantageously, the control unit is configured for determining a speed at the end of said deceleration phase and for actuating the motor after detection of said deceleration phase so that the speed of the scooter is greater than the speed determined at the end of said deceleration phase.

With this arrangement, the assistance provided by the actuation of the motor gives the possibility of reducing, or even suppressing, the effects of the deceleration for the period substantially equal to the first predetermined threshold of the deceleration phase detected by the deceleration detection means. In other words, the control unit is configured so as to actuate the motor so that the speed of the motor-driven scooter gets closer to the target speed which the user wishes to impart to the scooter, at the end of the pulse(s) which he/she has exerted.

Advantageously, the control unit is configured for actuating the motor for a pre-determined period.

With this arrangement, the motor is not actuated continuously, thereby allowing alternation of manual propulsion phases for example by means of pulses exerted in a traditional way by the user, and assisted propulsion phases, by actuation of the motor. Further, with this arrangement, the assistance capability of the scooter, which thus combines different propulsion modes, is increased.

Preferably, the control unit is configured for stopping actuation of the motor when a new acceleration phase is detected while the motor is actuated.

With this arrangement, the use in a traditional way of the scooter, by means of pulses exerted by the user, is not prevented by the actuation of the motor.

Advantageously, the control unit is configured for again actuating the motor when a new deceleration phase having a period at least equal to the first predetermined threshold has been detected by the deceleration detection means after the new acceleration phase.

Thus, the assistance phases by actuation of the motor and the manual propulsion phases by the pulses exerted by the user may follow on from each other in a fluid and intuitive way, thus allowing association of the advantages of motor-driven assistance with the sports practice inherent to scootering. The user may therefore decide to increase the set speed value by giving a new pulse.

Advantageously, the scooter further includes a device for determining the speed of the scooter, and the control unit is configured for stopping the actuation of the motor when a positive variation of the speed of the scooter greater than a second predetermined threshold is detected.

Thus, when the speed of the scooter exceeds the set speed value of the scooter by more than the predetermined second threshold, or in other words, when the speed of the scooter increases by more than the second predetermined threshold relatively to the set speed value, the actuation of the motor is interrupted. With this arrangement, the safety of the user as well as that of persons moving near the scooter are not compromised by the device according to the present invention, the motor-driven assistance not being added to the effects of this increase in speed which may, for example and in a non-limiting way, be due to a downward slope of the road on which the scooter is running, to a new pulse exerted by the user, . . .

Preferably, the control unit is configured for stopping the actuation of the motor when the positive variation of the speed of the scooter is greater than the second predetermined threshold, for a period greater than a third predetermined threshold.

With this arrangement, the actuation of the motor is not stopped by an acceleration greater than the second predetermined threshold, for a period of less than the third predetermined threshold. In other words, the assistance of the scooter is not stopped by a sudden but short acceleration; such an accidental acceleration may occur for example from irregularities of the road or from contact with the edge of a pavement.

By accidental acceleration is meant any acceleration distinct from an acceleration caused voluntarily by a pulse given by the user to the scooter.

Advantageously, the control unit is configured so as not to actuate the motor when the speed of the scooter is greater than a fourth predetermined threshold.

In other words, the maximum reachable speed by motorization is less than the fourth predetermined threshold.

With this arrangement, the scooter cannot be maintained, by actuation of the motor, at a speed greater than the fourth predetermined threshold, so as not to compromise the safety of the user and of the other users of the space on which runs the scooter. This arrangement in particular gives the possibility of complying with customary practices in public spaces, for example when the scooter runs on a pavement.

Advantageously the control unit is configured so as not to actuate the motor when the speed of the scooter is less than a fifth predetermined threshold.

With this arrangement, the motor is not actuated untimely, for example when the user is walking beside the scooter.

Preferably, the scooter further includes a braking device and the control unit is configured for stopping the actuation of the motor when the braking device is actuated.

Thus, in a simple and intuitive way, the actuation of the motor is stopped, in order to allow the user to effectively and rapidly reduce the speed of the scooter and thus adapt to the encountered restrictions.

SHORT DESCRIPTION OF THE DRAWINGS

Figure 1B:
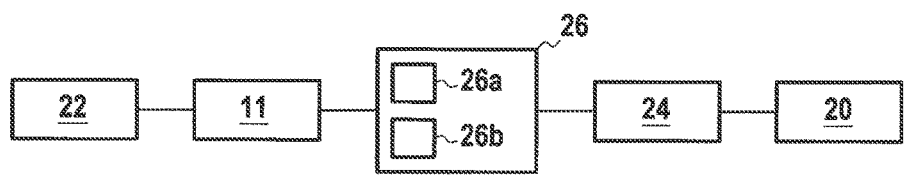
Figure 2B:
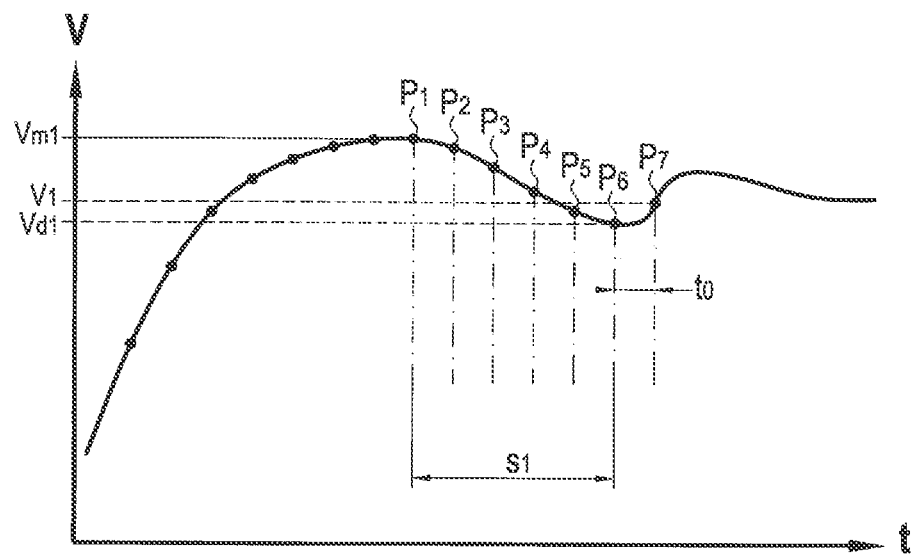
Figure 2C:
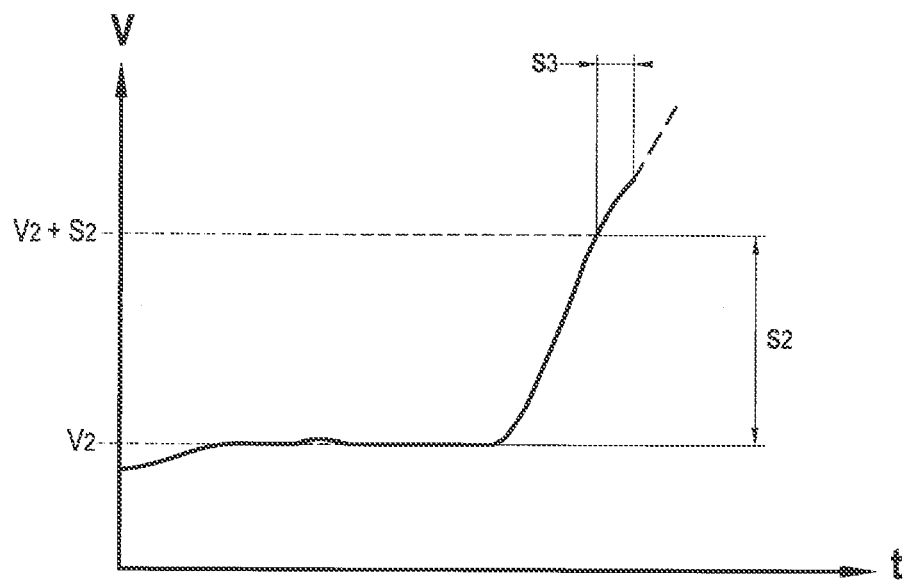

Other features and advantages of the invention will become more clearly and completely apparent upon reading the description hereafter of a preferred embodiment, given as a non-limiting example and with reference to the following appended drawings wherein:

FIGS. 1A and 1B schematically represent an exemplary scooter according to the present invention; and FIGS. 2A, 2B and 2C schematically illustrate different examples of time-dependent changes in the speed of the scooter according to the present invention.

DETAILED DESCRIPTION OF THE INVENTION

In the example illustrated in FIGS. 1A and 1B, the scooter 10 according to the invention traditionally includes a frame 12, a front wheel 20 and a rear wheel 22.

The frame 12 of the scooter 10 includes a platform 14 positioned between the front 20 and rear 22 wheels, and a steering column 16 one end of which is attached to the front wheel 20, the steering column 16 including a handlebar 18 at its opposite end.

Further, the scooter 10 according to the present invention includes a motor 24 configured for driving into rotation the front wheel 20 and a control unit 26 configured for controlling the motor 24.

For example, and in a non-limiting way, the motor 24 of the scooter 10 is an electric motor mounted on the hub of the front wheel 20, the scooter 10 further including a battery 28 positioned between the steering column 16 and the platform 14.

Of course, it would be possible to design, and without departing from the scope of the present invention, any other motor type, such as a combustion motor, configured for driving into rotation either one of the front 20 and rear 22 wheels.

The scooter 10 moreover includes a braking device 30 which may, for example and in a non-limiting way, be actuated from the handlebar 18 of the scooter 10, the braking device being configured so as to oppose rotation of the front wheel 20.

The scooter 10 also includes a device for determining the speed of the scooter; for example and in a non-limiting way, the device for determining the speed is a sensor 11 mounted on the rear wheel 22 and configured so as to acquire at regular intervals, separated by a period t0, the speed of the scooter 10. This may also be a sensor for sensing the speed of rotation of one of the two wheels of the scooter.

Moreover, the control unit 26 in particular includes acceleration detection means 26a and deceleration detection means 26b, configured for detecting an acceleration phase and a deceleration phase of the scooter 10, respectively.

The control unit 26 is configured for actuating the motor 24 and thus drives into rotation the front wheel 20 of the scooter 10, if certain conditions, which will appear more clearly in the description of FIGS. 2A, 2B and 2C, are fulfilled.

FIGS. 2A, 2B and 2C schematically illustrate examples of time-dependent changes in the speed of the scooter 10 according to the present invention.

More particularly, FIGS. 2A, 2B and 2C represent the time-dependent changes of the speed of the scooter 10, according to the actions exerted by the user of the scooter 10, these actions may consist in pulses i0, i1, i2, i3, i4, i5 applied by the user onto the scooter 10, or an actuation f1 of the braking device 30.

FIGS. 2A, 2B and 2C illustrate first s1, second s2, third s3, fourth s4 and fifth s5 predetermined thresholds which will be described in more detail in the following.

In this non-limiting example, the first predetermined threshold s1 has a value of 200 ms; the second predetermined threshold s2 has a value of 10 revolutions per minute; the third predetermined threshold s3 has a value of 200 ms; the fourth predetermined threshold s4 has a value of 400 revolutions per minute; the fifth predetermined threshold s5 has a value of 100 revolutions per minute.

Moreover, FIGS. 2A, 2B and 2C represent, alternately in dotted lines and in solid lines, the phases during which the scooter respectively operates in a manual way, by means of the muscular forces exerted by the user, and with the assistance of the motor 24 actuated by the control unit 26.

For the sake of clarity, the lower portion of FIG. 2A illustrates the periods during which the motor 24 is actuated by the control unit 26, the height of the different blocks depending on the speed at which the scooter 10 is maintained during different actuation phases of the motor 24.

Traditionally, as the scooter 10 is initially at a standstill, in order to set it into motion, the user exerts a first pulse i0.

As illustrated in FIG. 2A, the speed measurements periodically made by the sensor 11 every t0 ms, with t0 for example in a non-limiting way, having the value of 40 ms, are increasing; the acceleration detection means 26a thus detect an acceleration phase.

The speed reached by the scooter 10 at the end of this first pulse i0 is less than the fifth predetermined threshold s5.

The control unit 26 is configured so as not to actuate the motor 24 when the speed of the scooter 10, determined by the speed determination device, is less than the fifth predetermined threshold s5; the motor 24 is therefore not actuated at the end of this first pulse i0.

After detection by the acceleration detection means 26a of the control unit 26, of the acceleration phase caused by the first pulse i0, the deceleration of detection means 26b detect a deceleration phase during a period less than the first pre-determined threshold s1.

The control unit 26 is configured so as to actuate the motor 24 when a deceleration phase having a period greater than or equal to the first predetermined threshold s1 has been detected by the deceleration detection means after detection of an acceleration phase by the acceleration detection means; the motor 24 is therefore not actuated during this deceleration phase.

The user then exerts a new pulse i1.

As illustrated in FIG. 2A, following this pulse i1, the acceleration detection means detect acceleration of the scooter, during which its speed, determined by the speed determination device, exceeds the fifth predetermined threshold s5 until it attains speed vm1, illustrated in FIG. 2B.

For example, and in a non-limiting way, the acceleration detection means detect an acceleration phase of the scooter 10 when the speeds successively determined by the speed determination device, measured at regular intervals t0, are increasing.

The deceleration detection means detect, as for them, a deceleration phase of the scooter 10 when the speeds successively determined by the speed determination device, measured at regular intervals t0, are decreasing. In particular, between the instants P1 to P6, illustrated in FIG. 2B, the speed of the scooter 10 determined by the speed determination device is decreasing.

Of course it would be possible to design any other acceleration and deceleration detection means, without departing from the scope of the present invention.

As illustrated in FIG. 2B, in which a deceleration phase follows an acceleration phase detected by deceleration detection means and acceleration detection means respectively, when the deceleration phase detected by the deceleration detection means has a period greater than the first predetermined threshold s1, the control unit 26 actuates the motor 24.

In the non-limiting example illustrated in FIG. 2B, the speed vm1 represents the greatest value of the speed of the scooter 10 determined by the speed determination device, reached at instant P1; the instant P1 corresponding to the measurement of the speed vm1 therefore corresponds both to the end of the acceleration phase detected by the acceleration detection means, and to the beginning of the deceleration phase detected by the deceleration detection means.

As illustrated in FIG. 2B, the first predetermined threshold s1 has a value, for example and in a non-limiting way, of 5 intervals t0, during which the speeds are determined by the speed determination device at instants P2, P3, P4, P5 and P6; at the end of the fifth decreasing speed determined following the speed vm1 by the speed determination device at instant P6, the motor 24 is actuated by the control motor, 26.

The instant P7 illustrated in FIG. 2B therefore corresponds to the first speed determined by the speed determination device during actuation of the motor 24.

In the illustrated example wherein 5 intervals of a duration of t0=40 ms are considered during the deceleration phase detected by the deceleration detection means 26b, the first predetermined threshold s1 therefore has a value of 200 ms.

In other words, it is understood that the control unit 26 of the motor 24 detects, by its acceleration detection means, an acceleration phase of the scooter 10 followed by a deceleration phase of the scooter 10, detected by its deceleration detection means. When the deceleration phase detected by the deceleration detection means has a duration at least equal to the first predetermined threshold s1, the control unit 26 actuates the motor 24.

As in particular illustrated in FIG. 2A, the control unit 26 is configured for actuating the motor 24 so that the speed of the scooter 10 is maintained at a set speed value v1, at the end of the pulse i1.

As illustrated in FIG. 2B, the set speed value v1 depends on the speed of the scooter 10 upon actuating the motor 24. In this example, the said speed value v1 has a constant value equal to about 180 revolutions per minute.

As this appears more clearly in the following of the description, the set speed value v1, at which the scooter 10 is maintained at the end of the pulse i1 is greater than the speed vd1 determined by the speed determination device at the end of the period s1 of the deceleration phase detected by the deceleration detection means. For example, and in a non-limiting way, the control unit 26 applies a factor greater than 1 to the speed vd1, for example 1.05.

Of course, it will be possible to design, and without departing from the scope of the present invention, a control unit 26 configured for actuating the motor 24 so that the set speed value v1 is equal to the speed vd1 determined at the end of the duration s1 of the deceleration phase detected by the deceleration selection means.

Alternatively, without departing from the scope of the present invention, the control unit 26 may be configured for actuating the motor 24 so that the set speed value v1 is equal to one of the speeds determined by the speed determination device during the deceleration phase, before the instant when the speed vd1 is reached.

As illustrated in FIG. 2A, the control unit 26 is configured for actuating the motor 24 for a predetermined period T, for example equal to 60 seconds.

As this appears in FIG. 2A, during the period T during which the motor 24 is actuated, slight variations of the speed of the scooter 10 may be determined by the speed determination device; the control unit 26 is configured so that, when these variations are not significant, the actuation of the motor 24 is not interrupted.

The meaning of the significance of the variations of speed of the scooter 10 as determined by the speed determination device when the motor 24 is actuated, will become more clearly apparent in the continuation of the description.

At the end of the predetermined period T, the control unit 26 interrupts the actuation of the motor 24, thus causing a deceleration of the speed of the scooter 10, related to the frictional forces applied to the scooter 10.

As illustrated in FIG. 2A, the user then applies a new pulse i2; the acceleration detection means thus detect a new acceleration phase.

As illustrated in FIG. 2A, and similarly to the configuration described in the observation of FIG. 2B, the control unit 26 of the motor 24 actuates the motor 24 when a deceleration phase with a duration greater than or equal to the first predetermined threshold s1 has been detected by the deceleration detection means after detection of an acceleration phase by the acceleration detection means.

The control unit 26 thus actuates the motor 24, so that the speed of the scooter 10 is maintained at a set speed value v2, in this example greater than v1, for example equal to 200 revolutions per minute. In particular it is seen that the set speed values v1 and v2 at which the speed of the scooter 10 is maintained respectively after the pulses i1 and i2, are different, insofar that they depend on the speed of the scooter 10 at the moment when the motor 24 is actuated by the actuating unit 26.

As illustrated in FIG. 2A, a new pulse i3 is exerted by the user, while the motor 24 is actuated, during the period T.

As in particular illustrated in FIG. 2C, following this pulse i3 inserted by the user, the acceleration detection means detect a new acceleration phase, during which the speed of the scooter 10 increases, substantially exceeding the set speed value v2. More specifically, the positive variation of the speed of the scooter, considered from the set speed value v2, is greater than the second predetermined threshold s2.

As this appears upon observing FIG. 2C, the control unit 26 is configured so that, when the speed of the scooter 10 determined by the speed determination device exceeds the set speed value v2 by more than the second predetermined threshold s2 for a duration greater than the third predetermined threshold s3, the actuation of the motor 24 is interrupted.

In other words, the control unit has detected a new pulse from the user and stops actuation of the motor.

At the end of the acceleration phase detected by the acceleration detection means caused by the pulse i3, and similarly to the behavior illustrated in FIG. 2A at the end of pulses i1 and i2, the deceleration detection means detect a deceleration phase for which the duration exceeds the first predetermined threshold s1, so that the actuation unit 26 actuates the motor 24, giving the possibility of maintain the speed of the scooter 10 to a set speed value v3 clearly greater than v2. In this example, v3 has a value of about 360 revolutions per minute.

The user exerts a new pulse i4, during the actuation of the motor 24, during the period T.

In a similar way to the behavior of the scooter 10 described with reference to FIG. 2C, the control unit 26 interrupts the actuation of the motor 24 when the positive variation of the speed of the scooter 10, relatively to the said speed value v3, is greater than the second predetermined threshold s2 during a period greater than the predetermined threshold s3.

As illustrated in FIG. 2A, at the end of the acceleration phase detected by the acceleration detection means and caused by the pulse i4, the speed of the scooter 10 determined by the speed determination device is greater than the fourth threshold s4, which in this example is equal to 400 revolutions per minute.

As a safety step, the control unit 26 is configured so as not to actuate the motor 24 when the speed of the scooter 10 determined by the determination device is greater than the fourth threshold s4.

Subsequently, the motor 24 is therefore not actuated; the deceleration detection means then detect a deceleration phase during which the speed of the scooter 10 decreases, until the user exerts a new pulse i5, as illustrated in FIG. 2A.

Similarly to the behavior described earlier, a deceleration phase with a period greater than the first predetermined threshold s1 being detected by the deceleration detection means after detection of an acceleration phase by the acceleration detection means, at the end of pulse i5, the control unit 26 actuates the motor 24.

The motor 24 is then actuated by the control unit 26 so that the speed of the scooter 10 is maintained at a set speed value v5 at the end of the pulse i5, the set speed value v5 being, similarly to the other actuation phases of the motor 24 described earlier, a function of the speed of the scooter 10 determined by the speed determination device during actuation of the motor 24. In this non-limiting example, the set speed value v5 is slightly greater than the speed determined at the end of the deceleration phase; for example it has the value of 330 revolutions per minute.

As illustrated in FIG. 2A, during actuation of the motor 24 by means of which the speed of the scooter 10 is maintained at the set speed value v5, a short positive variation in the speed of the scooter 10 is determined by the speed determination device; unlike the behavior described with reference to FIG. 2C, the positive variation of the speed of the scooter 10 is not greater than the second predetermined threshold s2 during a period greater than the third predetermined threshold s3.

As described earlier, as the control unit 26 is configured so as to stop the actuation of the motor 24 when the positive variation of the speed of the scooter 10 is greater than the second predetermined threshold s2 during a period greater than a third predetermined threshold s3, the actuation of the motor 24 is not stopped by the control unit 26 when the speed determination device detects said short positive variation in the speed of the scooter 10.

In other words, the variation in the speed of the scooter 10 illustrated in FIG. 2A during actuation of the motor 24 following the pulse i5 being of an accidental nature and not caused by a new pulse exerted by the user, the control unit 26 does not interrupt the actuation of the motor 24.

In order that a variation in the speed of the scooter 10 determined by the speed determination device be considered as significant by the control unit 26 and that it causes, as such, the interruption of the actuation of the motor 24, it is therefore required on the one hand that it be greater than the corresponding set speed value by a value at least equal to the second predetermined threshold s2, and that on the other hand, the exceeding of the second predetermined threshold s2 is determined by the speed determination device during a period greater than the third predetermined threshold s3.

After this accidental acceleration, and as illustrated with reference f1 in FIG. 2A, the braking device 30 is actuated by the user.

The control unit 26 is configured for stopping the actuation of the motor 24 when the braking device 30 is actuated by the user.

Subsequently, the deceleration detection means detect a new deceleration phase during which the speed of the scooter 10 decreases until it is less than the fifth predetermined threshold s5.

The control unit 26 of the scooter 10 according to the present invention may also include a parameterization device configured for allowing the user to modify the value of the predetermined thresholds s1, s2, s3, s4 and s5.

The duration of the period t0 for determining the speeds of the scooter 10 with the speed determination device may also, without departing from the scope of the present invention, be modified by the parameterization device.

It would also be possible to design a control unit 26 configured for actuating the motor 24, when the conditions described above are fulfilled, in an unlimited way.

As described with reference to FIGS. 1, 2A, 2B and 2C, the scooter 10 according to the present invention is therefore configured for applying a motor-driven assistance method comprising:
  a step for detecting an acceleration phase of the scooter;
  a step for detecting a deceleration phase of the scooter;
  a step for measuring the duration of the deceleration phase; and
  a step for actuating the motor 24 when the deceleration phase has a duration at least equal to the first predetermined threshold s1.

The motor-driven assistance method also comprises a step consisting of detecting a new acceleration phase during the step for actuating the motor, and a step consisting of stopping the actuation of the motor.

Moreover, the motor-driven assistance method applied by the scooter 10 according to the present invention also comprises:
  a step consisting of detecting a positive variation of the speed of the scooter greater than the second predetermined threshold s2 during actuation of the motor;
  a step consisting of measuring the duration during which the positive variation of the speed of the scooter is greater than the second predetermined threshold s2; and
  a step consisting of stopping the actuation of the motor 24 when the positive variation of the speed of the scooter is greater than the second predetermined threshold s2 for a duration greater than the third predetermined threshold s3.

Finally, the motor driven assistance method also comprises a step consisting of detecting possible actuation of the braking device 30 while the motor is actuated, and a step consisting of stopping the actuation of the motor, in the case of detecting actuation of the braking device.

The description above is given as an example and is therefore not a limitation of the invention.

In particular traditional operation of the travelling means., the invention, although particularly adapted to the field of scooters, may also equip any travelling means, such as a bicycle or a skateboard so as to provide motor-driven assistance without preventing traditional operation of the traveling means.

The invention claimed is:
1. A scooter including:
  a frame;
  a front wheel and a rear wheel attached to the frame;

a motor configured for driving into a rotation at least one of the front and rear wheels; and a unit for controlling the motor;

wherein the unit includes:

an acceleration detection device for detecting an acceleration phase of the scooter; and a deceleration detection device for detecting a deceleration phase of the scooter;

the unit being configured for operating the motor when a deceleration phase having a period at least equal to a first predetermined threshold has been detected by the deceleration detection device after detection of an acceleration phase by the acceleration detection device.

2. The scooter according to claim 1, wherein the control unit is configured for operating the motor after detection of said deceleration phase so that the speed of the scooter is maintained at a set speed value.

3. The scooter according to claim 2, wherein said set speed value depends on the speed of the scooter upon operation of the motor.

4. The scooter according to claim 2, wherein the control unit is configured for determining a speed at the end of said deceleration phase, and wherein the unit is configured for operating the motor after detection of said deceleration phase so that the speed of the scooter is greater than the speed determined at the end of said deceleration phase.

5. The scooter according to claim 1, wherein the unit is configured for operating the motor for a predetermined period.

6. The scooter according to claim 1, wherein the unit is configured for stopping the operation of the motor when a new acceleration phase is detected while the motor is operated.

7. The scooter according to claim 6, wherein the control unit is configured for re-operating the motor when a new deceleration phase having a period at least equal to the first predetermined threshold has been detected by the deceleration detection device after the new acceleration phase.

8. The scooter according to claim 1, wherein the scooter further includes a device for determining the speed of the scooter, and wherein the unit is configured for stopping the operation of the motor when a positive variation in the speed of the scooter greater than a second predetermined threshold is detected.

9. The scooter according to claim 8, wherein the unit is configured for stopping the operation of the motor when the positive variation of the speed of the scooter is greater than the second predetermined threshold for a period greater than a third predetermined threshold.

10. The scooter according to claim 1, wherein the scooter further includes a braking device, and wherein the unit is configured for stopping the operation of the motor when the braking device is operated.

\* \* \* \* \*